United States Patent
Yang et al.

(10) Patent No.: US 12,153,919 B2
(45) Date of Patent: Nov. 26, 2024

(54) EFFICIENT INSTRUCTION TRANSLATION METHOD, AND PROCESSOR

(71) Applicant: Shanghai Zhaoxin Semiconductor Co., Ltd., Shanghai (CN)

(72) Inventors: Mengchen Yang, Beijing (CN); Juanli Song, Beijing (CN)

(73) Assignee: SHANGHAI ZHAOXIN SEMICONDUCTOR CO., LTD., Shanghai (CN)

(*) Notice: Subject to any disclaimer, the term of this patent is extended or adjusted under 35 U.S.C. 154(b) by 26 days.

(21) Appl. No.: 18/356,455

(22) Filed: Jul. 21, 2023

(65) Prior Publication Data

US 2024/0168760 A1    May 23, 2024

(30) Foreign Application Priority Data

Nov. 22, 2022    (CN) .......................... 202211466947.2

(51) Int. Cl.
*G06F 9/22*    (2006.01)

(52) U.S. Cl.
CPC .................................. *G06F 9/223* (2013.01)

(58) Field of Classification Search
CPC .............................. G06F 15/76; G06F 9/223
See application file for complete search history.

(56) References Cited

U.S. PATENT DOCUMENTS

| | | | | |
|---|---|---|---|---|
| 6,023,757 | A * | 2/2000 | Nishimoto | G06F 9/3861 712/E9.035 |
| 6,425,074 | B1 * | 7/2002 | Meier | G06F 9/38585 712/217 |
| 7,644,210 | B1 * | 1/2010 | Banning | G06F 9/323 717/136 |
| 2003/0093775 | A1 * | 5/2003 | Hilton | G06F 9/45504 717/138 |
| 2004/0225869 | A1 * | 11/2004 | Pagni | G06F 9/30174 712/E9.037 |
| 2010/0064122 | A1 * | 3/2010 | Henry | G06F 9/3017 712/E9.032 |
| 2010/0274551 | A1 * | 10/2010 | Das | G06F 9/45504 703/26 |
| 2016/0321049 | A1 * | 11/2016 | Morgan | G06F 8/52 |
| 2019/0220280 | A1 * | 7/2019 | Sebot | G06F 17/15 |
| 2021/0365252 | A1 * | 11/2021 | Kawakami | G06F 8/40 |

(Continued)

FOREIGN PATENT DOCUMENTS

WO    WO-9859292 A1 * 12/1998    ............... G06F 8/52

*Primary Examiner* — Cheng Yuan Tseng
(74) *Attorney, Agent, or Firm* — McClure, Qualey & Rodack, LLP

(57) ABSTRACT

A processor with efficient instruction translation is shown, which uses a microcode device that has a first storage device with a micro-operation bit width. The first storage device stores a fast translation table that records micro-operations corresponding to a particular complex instruction. When determining that a received macro instruction is the particular complex instruction, an instruction translator operates a register alias table hardware to enable the microcode device to query the fast translation table to obtain and return the micro-operations corresponding to the particular complex instruction to the register alias table hardware, for running execution units of the processor.

23 Claims, 3 Drawing Sheets

(56) References Cited

U.S. PATENT DOCUMENTS

2023/0259365 A1* 8/2023 Hayano ............... G06F 9/30145
　　　　　　　　　　　　　　　　　　　　712/226
2024/0168760 A1* 5/2024 Yang ....................... G06F 9/223

* cited by examiner

EFFICIENT INSTRUCTION TRANSLATION METHOD, AND PROCESSOR

CROSS REFERENCE TO RELATED APPLICATIONS

This application claims priority of China Patent Application No. 202211466947.2, filed on Nov. 22, 2022, the entirety of which is incorporated by reference herein.

BACKGROUND

Technical Field

The present disclosure relates to processors, and, in particular, to instruction translation in a processor.

Description of the Related Art

To operate the execution units of a processor, a macro instruction fetched by the processor needs to be translated into micro-operations (μops).

For a processor in a complex instruction set computer (CISC), some macro instructions are complex instructions. It is necessary to first search a memory to obtain compressed microcode instructions, and then decompress and decode them to get micro-operations (μops). The process of translating a complex instruction into micro-operations (μops) requires a lot of computing resources, and may involve several steps (taking several time cycles). Such a translation procedure may be regarded as an instruction trap.

How to reduce the impact of instruction traps on the processor's performance is an important issue in this technical field.

BRIEF SUMMARY

In the disclosure, a processor provides a fast translation table, so that a particular complex instruction is translated into micro-operations (μops) by simply looking it up in the fast translation table.

A processor, in accordance with an exemplary embodiment of the disclosure, includes an instruction translator, register alias table (RAT) hardware coupled to the instruction translator, and a microcode device coupled to the register alias table (RAT) hardware. Specially, the microcode device has a first storage device with a micro-operation bit width, and the first storage device stores a fast translation table that records micro-operations (μops) corresponding to a particular complex instruction. When determining that a received macro instruction is the particular complex instruction, the instruction translator operates the register alias table (RAT) hardware to output a zero-trapping enable signal (z_trap) to enable the microcode device to query the fast translation table to obtain and return the micro-operations (μops) corresponding to the particular complex instruction to the register alias table (RAT) hardware, for running execution units of the processor.

In an exemplary embodiment, the microcode device further comprises a normal decoder. The normal decoder has a second storage device that is in a different bit width than the micro-operation bit width. When determining that a received macro instruction is a normal complex instruction, the instruction translator operates the register alias table (RAT) hardware to output a normal decoder enable signal (Uc_trap) to enable the normal decoder to obtain micro-operations (μops) corresponding to the normal complex instruction by reading the second storage device, and return the micro-operations (μops) corresponding to the normal complex instruction to the register alias table (RAT) hardware for running the execution units of the processor.

In an exemplary embodiment, the normal decoder takes multiple time cycles to decompress and decode contents read from the second storage device. Especially, contents read from the fast translation table do not require decompression.

In an exemplary embodiment, the first storage device has a plurality of banks, the number of which is equal to the maximum number of micro-operations (μops) that the normal decoder outputs per time cycle.

In an exemplary embodiment, based on a lookup result which is the result of looking it up in the fast translation table the microcode device tags valid labels on the micro-operations (μops) corresponding to the particular complex instruction.

In an exemplary embodiment, the microcode device combines contents read from the fast translation table with processor information, to generate the micro-operations (μops) corresponding to the particular complex instruction.

In an exemplary embodiment, the microcode device further comprises a first multiplexer, coupling the micro-operations (μops) decoded from the normal decoder or the micro-operations (μops) obtained by looking it up in the fast translation table to the register alias table (RAT) hardware. Based on a lookup result which is the result of looking it up in the fast translation table, the microcode device generates an ending mark signal. Based on the ending mark signal and a sudden unexpected event, the microcode device generates a zero-trapping output control signal to control the first multiplexer.

In an exemplary embodiment, the microcode device also includes a second multiplexer, coupling a trap address or a self-incremented address to the first storage device to query the fast translation table. The trap address is provided by the register alias table (RAT) hardware, which is used for a first time cycle query of the fast translation table. The self-incremented address is used for querying the fast translation table in consecutive time cycles following the first time cycle query.

In an exemplary embodiment, the particular complex instruction is a performance-sensitive instruction. The number of micro-operations corresponding to the particular complex instruction is within a specific amount, or the occurrence frequency of the particular complex instruction is higher than the critical frequency. Especially, the particular complex instruction does not involve local branches that need to be processed at a decoding stage. The particular complex instruction may be a system call instruction (syscall), a system return instruction (sysret), a register swapping instruction (swapgs), a stack write/read instruction (push/pop), and so on.

In another exemplary embodiment, an efficient instruction translation method for a processor is shown.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION

The following description is made for the purpose of illustrating the general principles of the disclosure and should not be taken in a limiting sense. The scope of the disclosure is best determined by reference to the appended claims.

Figure 1:
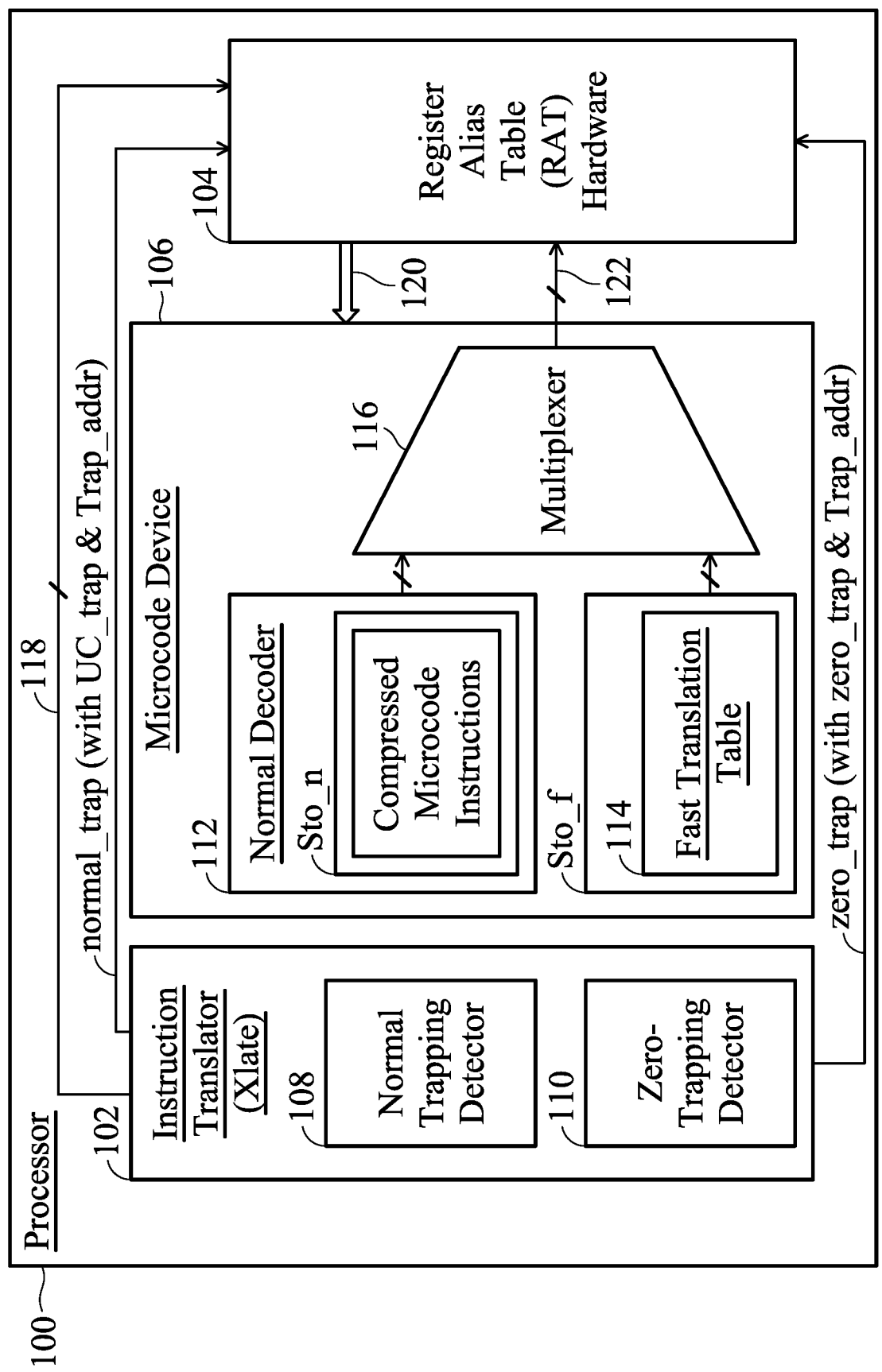
FIG. 1 depicts a processor 100 in accordance with an exemplary embodiment of the disclosure.

FIG. 1 depicts a processor 100 in accordance with an exemplary embodiment of the disclosure, which uses an instruction translator (Xlate) 102, register alias table (RAT) hardware 104, and a microcode device 106 to translate a macro instruction into micro operations (μops). In the disclosure, at least one particular complex instruction is translated in a high speed way (zero trapping). There are two types of complex instructions: particular complex instructions which are zero trapping; and normal complex instructions that are not the particular complex instructions. The disclosure introduces two different translation paths for these two types of complex instructions.

The instruction translator (Xlate) 102 includes a normal trapping detector 108 and a zero-trapping detector 110. The microcode device 106 includes a normal decoder 112 (using a storage device Sto_n), a storage device Sto_f storing a fast translation table 114, and a multiplexer 116. Other implementations may place the multiplexer 116 outside the microcode device 106 without being packaged together with the normal decoder 112 and storage device Sto_f.

The normal trapping detector 108 determines whether a macro instruction received by the instruction translator (Xlate) 102 is a simple instruction. If so, the instruction translator (Xlate) 102 itself has the capability to translate the simple instruction into micro-operations (μops). The instruction translator (Xlate) 102 supplies the translated micro-operations (μops) 118 to the register alias table (RAT) hardware 104 to run the execution units of the processor 100.

Regarding complex instructions that are not simple instructions, the normal trapping detector 108 will identify whether they are normal complex instructions (not the particular complex instructions defined in the disclosure). If so, through the normal trapping path normal_trap, the instruction translator (Xlate) 102 drives the register alias table (RAT) hardware 104 to transfer, through the interface 120, a normal decoder enable signal Uc_trap and a trap address (Trap_addr) to the normal decoder 112. The normal decoder 112 in the microcode device 106, therefore, is enabled to access the storage device Sto_n based on the trap address (Trap_addr). In the illustrated embodiment, the normal decoder enable signal (Uc_trap) and the trap address (Trap_addr) are generated by the instruction translator (Xlate) 102, transferred from the instruction translator (Xlate) 102 to the register alias table (RAT) hardware 104 through the normal trapping path normal_trap, and then further transferred from the register alias table (RAT) hardware 104 to the microcode device 106 through the interface 120, and finally recognized by the microcode device 106 to be passed to the normal decoder 112.

The storage device Sto_n stores compressed microcode instructions. Decompression and decoding procedures are required to convert the compressed microcode instructions into micro-operations (μops). Generally, the micro-operations (μops) output from the normal decoder 112 are supplied to the register alias table (RAT) hardware 104 through the multiplexer 116 and the interface 122, to run the execution units of the processor 100.

The zero-trapping detector 110 is used to identify whether a received macro instruction is the particular complex instruction defined in the disclosure. If so, through the zero-trapping path zero_trap, the instruction translator (Xlate) 102 drives the register alias table (RAT) hardware 104 to transfer, through the interface 120, a zero-trapping enable signal (z_trap) and a trap address (Trap_addr) to the microcode device 106 to query the fast translation table 114. In the illustrated embodiment, the zero-trapping enable signal (z_trap) and the trap address (Trap_addr) are generated by the instruction translator (Xlate) 102, transferred from the instruction translator (Xlate) 102 to the register alias table (RAT) hardware 104 through the zero-trapping path zero_trap, and then further transferred from the register alias table (RAT) hardware 104 to the microcode device 106 through the interface 120, and finally recognized by the microcode device 106 for a query of the fast translation table 114.

The fast translation table 114 is looked up according to the trap address (Trap_addr). The fast translation table 114 does not store compressed microcode instructions, but directly stores micro-operations (μops) corresponding to the particular complex instructions. In this way, neither decompression nor decoding, the micro-operation (μops) of the particular complex instruction are directly obtained by simply looking it up in the fast translation table 114. The obtained micro-operation (μops) are supplied to the register alias table (RAT) hardware 104 through the multiplexer 116 and the interface 122, to run the execution units of the processor 100.

In particular, the storage device Sto_f of the fast translation table 114 is different from the storage device Sto_n. The bit width of the storage device Sto_f storing the fast translation table 114 conforms to the micro-operation (μops) bit width, which is different from the bit width of the storage device Sto_n that stores compressed microcode instructions. The bit width of the storage device Sto_n may be smaller than the bit width of the storage device Sto_f. The storage device Sto_n is designed for mass storage. In contrast, although the storage device Sto_f sacrifices its mass storage capacity, the stored uncompressed micro-operations can speed up the instruction translation.

The details of the normal decoder 112 are further described below, and the difference between it and the table look-up technique used with the fast translation table 114 is shown. The normal decoder 112 involves four steps (numbered as A, B, C, and D), each of which consumes one or more time cycles. The four steps A to D are performed in a first time interval, a second time interval, a third time interval, and a fourth time interval.

In the first step A, the normal decoder 112 receives a trap address (Trap_addr) provided by the register alias table (RAT) hardware 104. In the second step B, the storage device Sto_n is read according to the trap address (Trap_addr) to obtain compressed microcode instructions. In the third step C, the compressed microcode instructions are decompressed. In the fourth step D, the decompressed microcode instructions are decoded into micro-operations (μops). The four steps A to D may take four time cycles (4T bubbles), or even more time cycles.

Compared with the normal decoder 112, the looking up of the fast translation table 114 needs less time cycles (e.g., less than 4T bubbles). In an exemplary embodiment, as soon as the fast translation table 114 is driven, one time cycle (1T) is enough to obtain the required micro-operations (μops).

The particular complex instructions (translated through the fast translation table 114) may be performance sensitive instructions which have significant performance improvements in compared with their traditional translation manner (translated through the normal decoder 112). The performance sensitive instructions may be the complex instructions which should be translated into a moderate size of micro-operations (μops) (a predetermined number of pops, e.g., 5-8 micro-operations, or involving two instruction cycles, or the other number of micro-operations/instruction cycles). In another exemplary embodiment, the performance sensitive instructions may be the complex instructions frequently used in the coding (e.g., with the occurrence frequency higher than the critical frequency).

In particular, the particular complex instructions do not involve local branches. Compared with a normal branch halted without execution until runtime, a local branch must be processed in the decoding stage (for example, to return an address in the decoding stage). Considering that there is no leeway to wait for a return address in the fast-table look-up translation, the particular complex instructions (translated through the fast translation table 114) do not include complex instructions involving any local branches.

The designer can evaluate how a complex instruction affects the system performance through the different translation paths (normal_trap and zero_trap). In some exemplary embodiments, the system performance may be significantly improved by the zero trapping manner, but the size of the translated micro-operations (μops) is too high (for example, more than 8 micro-operations, or more than other critical numbers). Considering the cost of storage space, such complex instructions are still not suitable for the zero-trapping design. In an exemplary embodiment, the look-up time of a particular complex instruction translated through the fast translation table 114 is less than four time cycles. A local branch, however, may need the four calculation cycles of the normal decoder 112 to determine the jump condition. The query of the fast translation table 114 is too fast (for example, 1T) to determine the jump condition. A complex instruction involving a local branch cannot be designed as the particular complex instruction with the zero-trapping technique.

In an exemplary embodiment, the particular complex instructions include a system call instruction (syscall), a system return instruction (sysret), a register swapping instruction (swapgs), a stack write/read instruction (push/pop), and so on.

The zero-trapping of the particular complex instructions can be achieved without increasing the number of interfaces between the register alias table (RAT) hardware 104 and the microcode device 106. Through the multiplexer 116 and the interface 122, the microcode device 106 can regularly provide a fixed number of micro-operations (μops) per time cycle to the register alias table (RAT) hardware 104 no matter it is zero-trapping translation or not. The paper describes an exemplary embodiment in which four micro-operations (μops) per time cycle are transferred through the interface 122. Other implementations may provide a higher number of micro-operations per time cycle. The principle is that the number of micro-operations obtained from the fast translation table 114 per time cycle is consistent with the number of micro-operations that the normal decoder 112 can supply per time cycle. The normal decoder enable signal Uc_trap the instruction translator 102 generates for the normal decoder 112 may be input to the microcode device 106 through the same interface 120 as the zero-trapping enable signal z_trap that the instruction translator 102 generates to be looked up in the fast translation table 114. The microcode device 106 may distinguish the normal decoder enable signal Uc_trap from the zero-trapping enable signal z_trap through a label or a specific bit. The microcode device 106 may use another multiplexer to direct the normal decoder enable signal Uc_trap to enable the normal decoder 112, or to direct the zero-trapping enable signal z_trap to enable a query of the fast translation table 114.

In an exemplary embodiment, the normal trapping detector 108 and the zero-trapping detector 110 may share some logic modules. Part of the control logic circuits of the normal decoder 112 may be also used for querying the fast translation table 114 in the zero-trapping path.

Figure 2:
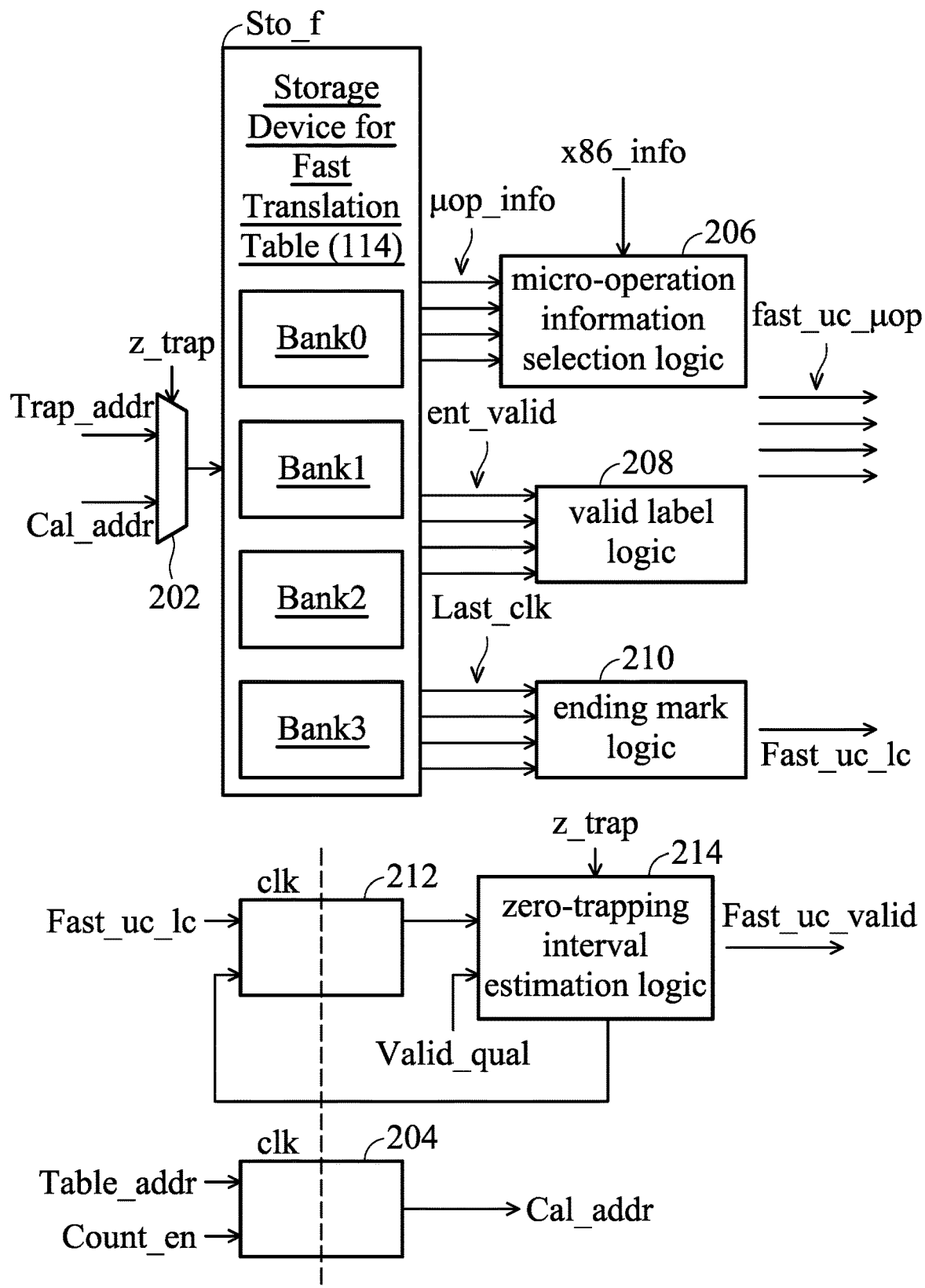
FIG. 2 is a block diagram illustrating a zero-trapping module 200 in accordance with an exemplary embodiment of the disclosure.

FIG. 2 is a block diagram illustrating a zero-trapping module 200 that includes the storage device Sto_f storing the fast translation table 114 and its control circuit. Each logic block shown in FIG. 2 may be a circuit, or a hardware-software co-design device that includes hardware running according to software.

In FIG. 2, the storage device Sto_f uses four banks Bank0, Bank1, Bank2, and Bank3 to store the fast translation table 114. In an exemplary embodiment, micro-operations (μops) are stored in the memory banks according to their lowest two address digits. Each read address triggers parallel read of the four memory banks Bank0, Bank1, Bank2, and Bank3.

When the instruction translator (Xlate) 102 drives the register alias table (RAT) hardware 104 to use a zero-trapping enable signal z_trap to start the zero-trapping module 200 that includes the storage device Sto_f storing the fast translation table 114, a trap address Trap_addr is also provided to the zero-trapping module 200. Through the multiplexer 202, the trap address Trap_addr is applied to read the fast translation table 114 in the initial time cycle to obtain 4 micro-operations (μops). In some exemplary embodiments, the required micro-operations (μops) are obtained through multi-cycle iterations of querying the fast translation table 114. The circuit 204 generates self-incremented addresses Cal_addr based on a table address Table_addr and a counting enable signal Count_en, which are used to read the fast translation table 114 in the subsequent time cycles after the initial time cycle.

In particular, the micro-operations queried from the fast translation table 114 do not include processor information yet, so the processor information needs to be added into the micro-operations. In addition, not all micro-operations queried from the fast translation table 114 are valid. For example, among the four micro-operations obtained in the initial time cycle, the micro-operations prior to the beginning micro-operation are all invalid. Similarly, among the four micro-operations obtained in the final time cycle, the micro-operations after the ending micro-operation are all invalid. Therefore, the micro-operations read from the fast translation table 114 needs to be tagged by valid labels, or even been marked by an ending mark. The blocks 206, 208, and 210 are used to implement these annotation functions.

Micro-operation information selection logic 206 is discussed first. It is shown that the micro-operation information μop info actually read from the fast translation table 114 needs to be combined with the processor information x86_info via the micro-operation information selection logic 206. The processor information x86_info may include address size, data size, or/and stack size, etc. The output content needs to carry a valid label (used in the parallel bank reading, to exclude invalid micro-operations prior to the beginning micro-operation of the complex instruction, and to exclude invalid micro-operations after the ending micro-operation of the complex instruction), and thereby the micro-operations fast_uc_μop are generated and passed to the register alias table (RAT) hardware 104 through the interface 122. The valid label logic 208 is used to generate the valid labels. The valid state ent_valid of each section of contents read from fast translation table 114 per time cycle is processed by the valid label logic 208 to form the valid labels to be carried by the micro-operations fast_uc_μop.

This paragraph introduces the ending mark logic 210. The storage device Sto_f storing the fast translation table 114 further provides an ending mark Last_clk, which indicates whether there is an ending micro-operation of the particular complex instruction in the four pieces micro-operation information pop info read in parallel. If so, the ending mark Last_clk marks the ending micro-operation. The ending mark Last_clk is converted into an ending mark signal Fast_uc_lc by the ending mark logic 210. After the ending mark signal Fast_uc_lc is processed by the circuit 212, any sudden unexpected event Valid_qual should be considered, so that the zero-trapping interval estimation logic 214 generates a zero-trapping output control signal Fast_uc_valid. The multiplexer 116 in FIG. 1 may select, according to the zero-trapping output control signal Fast_uc_valid, to output the micro-operation (μops) decoded by the normal decoder 112 or the micro-operations fast_uc_μop obtained by looking it up in the fast translation table 114 table to the register alias table (RAT) hardware 104. The sudden unexpected event Valid_qual may be pipeline flushing, or reset . . . etc. In an exemplary embodiment, in response to the sudden unexpected event Valid_qual, the multiplexer 116 is controlled not to pass the micro-operations fast_uc_μop (obtained by looking it up in the fast translation table 114) to the register alias table (RAT) hardware 104.

Figure 3:
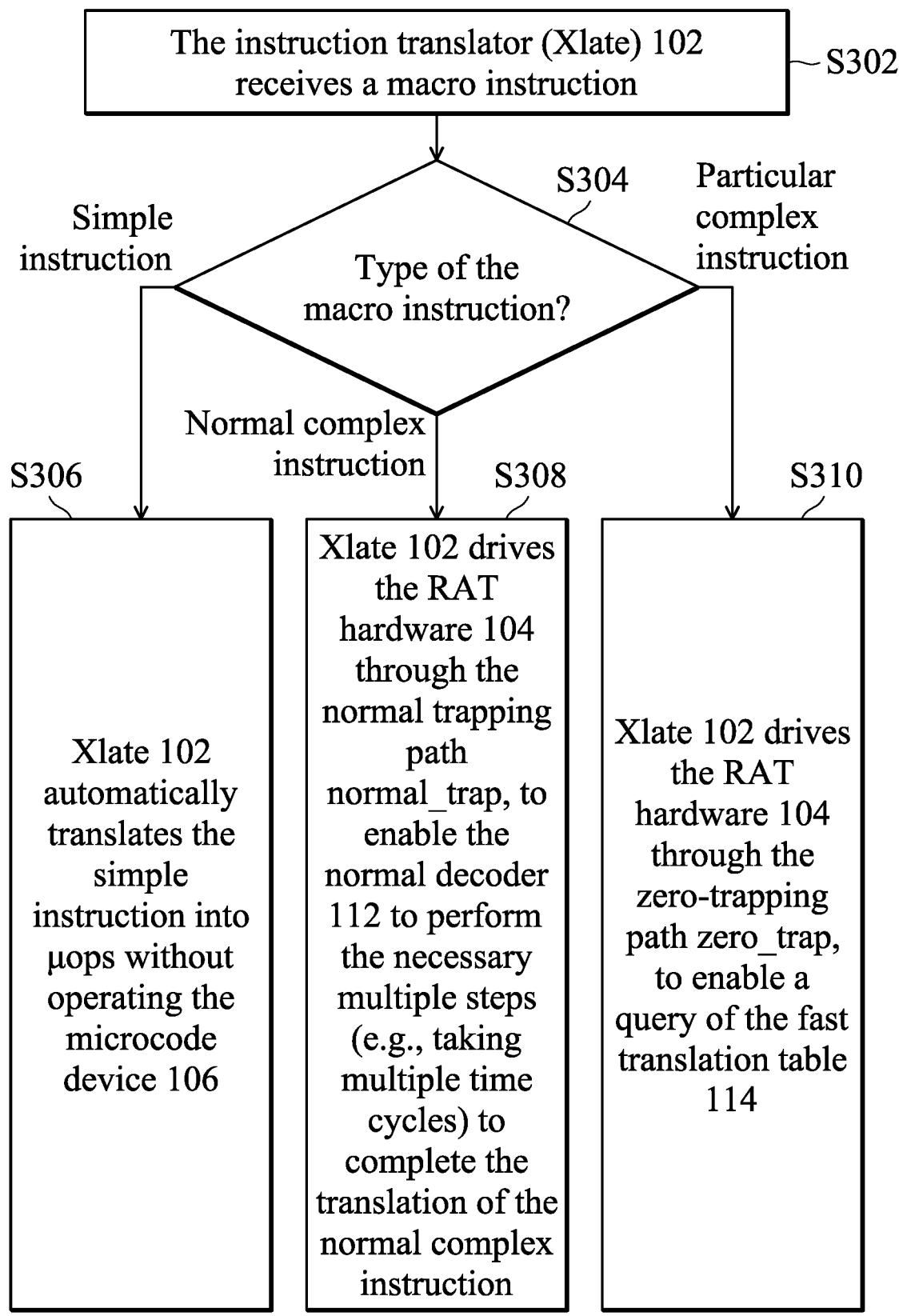
FIG. 3 is a flowchart illustrating a macro instruction translation method in accordance with an exemplary embodiment of the disclosure.

FIG. 3 is a flowchart illustrating a macro instruction translation method in accordance with an exemplary embodiment of the disclosure.

In step S302, the instruction translator (Xlate) 102 receives a macro instruction.

In step S304, the instruction translator (Xlate) 102 determines that the macro instruction is a simple instruction, a normal complex instruction, or a particular complex instruction with the zero-trapping design of the disclosure.

When determining that the macro instruction is a simple instruction, the procedure proceeds to step S306. The instruction translator (Xlate) 102 automatically translates the simple instruction into micro-operations (μops) without operating the microcode device 106, and hands the micro-operations (μops) to the register alias table (RAT) hardware 104 to run the execution units of the processor 100.

When the macro instruction is a normal complex instruction defined in the disclosure, the procedure proceeds to step S308, and the instruction translator (Xlate) 102 drives the register alias table (RAT) hardware 104 through the normal trapping path normal_trap, to enable the normal decoder 112 to perform the necessary multiple steps (e.g., taking multiple time cycles) to complete the translation of the normal complex instruction. The register alias table (RAT) hardware 104 can provide the normal decoder enable signal UC_trap and the trap address Trap_addr to the normal decoder 112 for operations. According to the translation, N micro-operations (μops) are delivered to the register alias table (RAT) hardware 104 per time cycle to run the execution units of the processor 100. N is a number.

When the macro instruction is the particular complex instruction defined in the disclosure, the procedure proceeds to step S310. The instruction translator (Xlate) 102 drives the register alias table (RAT) hardware 104 through the zero-trapping path zero_trap, to enable a query of the fast translation table 114. The register alias table (RAT) hardware 104 can provide a zero-trapping enable signal z_trap and a trap address Trap_addr to the control circuit that operates to read the fast translation table 114. According to the translation, the number of micro-operations (μops) delivered to the register alias table (RAT) hardware 104 per time cycle to run the execution units of the processor 100 is still N The aforementioned concepts are also used to implement a method for instruction translation. When a macro instruction is identified as a particular complex instruction, the fast translation table 114 is looked up to provide the multiple micro-operations (μops) corresponding the particular complex instruction and, accordingly, the execution units of the processor 100 operate. The first storage device Sto_f storing the fast translation table 114 is in a bit width that complies with the bit width of each micro-operation.

While the disclosure has been described by way of example and in terms of the preferred embodiments, it should be understood that the disclosure is not limited to the disclosed embodiments.

What is claimed is:

1. A processor, having an instruction translator, register alias table hardware coupled to the instruction translator, and a microcode device coupled to the register alias table hardware, and characterized in that:
   the microcode device has a first storage device with a micro-operation bit width, and the first storage device stores a fast translation table that records micro-operations corresponding to a particular complex instruction;
   when determining that a received macro instruction is the particular complex instruction, the instruction translator operates the register alias table hardware to output a zero-trapping enable signal to enable the microcode device to query the fast translation table to obtain and return the micro-operations corresponding to the particular complex instruction to the register alias table hardware, for running execution units of the processor.

2. The processor as claimed in claim 1, wherein:
   the microcode device further comprises a normal decoder;
   the normal decoder has a second storage device that is in a different bit width than the micro-operation bit width; and
   when determining that a received macro instruction is a normal complex instruction, the instruction translator operates the register alias table hardware to output a normal decoder enable signal to enable the normal decoder to obtain micro-operations corresponding to the normal complex instruction by reading the second storage device, and return the micro-operations corresponding to the normal complex instruction to the register alias table hardware for running the execution units of the processor.

3. The processor as claimed in claim 2, wherein:
   the normal decoder takes multiple time cycles to decompress and decode contents read from the second storage device; and
   contents read from the fast translation table do not require decompression.

4. The processor as claimed in claim 2, wherein:
   the first storage device has a plurality of banks, the number of which is equal to the maximum number of micro-operations that the normal decoder outputs per time cycle.

5. The processor as claimed in claim 4, wherein:
based on a lookup result which is the result of looking it up in the fast translation table by the microcode device, the microcode device tags valid labels on the micro-operations corresponding to the particular complex instruction.

6. The processor as claimed in claim 4, wherein:
the microcode device based on a lookup result which is the result of looking it up in the fast translation table and processor information, generates the micro-operations corresponding to the particular complex instruction.

7. The processor as claimed in claim 4, wherein:
the microcode device further comprises a first multiplexer, coupling the micro-operations decoded from the normal decoder or the micro-operations obtained by querying the fast translation table to the register alias table hardware;
based on a lookup result which is the result of looking it up in the fast translation table, the microcode device generates an ending mark signal; and
based on the ending mark signal and a sudden unexpected event, the microcode device generates a zero-trapping output control signal to control the first multiplexer.

8. The processor as claimed in claim 4, wherein:
the microcode device also includes a second multiplexer, passing a trap address or a self-incremented address to the first storage device to query the fast translation table;
the trap address is provided by the register alias table hardware, which is used for a first time cycle query of the fast translation table; and
the self-incremented address is used for querying the fast translation table in consecutive time cycles following the first time cycle query.

9. The processor as claimed in claim 3, wherein:
the second storage device stores compressed microcode instructions;
through operations in a first time interval, the normal decoder receives a trap address from the register alias table hardware;
through operations in a second time interval, the normal decoder reads the second storage device according to the trap address to obtain compressed microcode instructions;
through operations in a third time interval, the normal decoder decompresses the compressed microcode instructions; and
through operations in a fourth time interval, the normal decoder decodes the decompressed microcode instructions to obtain the micro-operations corresponding to the normal complex instruction.

10. The processor as claimed in claim 3, wherein:
when determining that a received macro instruction is a simple instruction, the instruction translator internally translates the simple instruction into micro-operations corresponding to the simple instruction, and returns the micro-operations corresponding to the simple instruction to the register alias table hardware for running execution units of the processor.

11. The processor as claimed in claim 3, wherein:
the particular complex instruction is a performance-sensitive instruction; and
the number of micro-operations corresponding to the particular complex instruction is within a specific amount, or an occurrence frequency of the particular complex instruction is higher than a critical frequency.

12. The processor as claimed in claim 3, wherein:
the particular complex instruction does not involve local branches that need to be processed at a decoding stage.

13. A method for instruction translation within a processor, characterized in that:
when determining that a received macro instruction is a particular complex instruction, providing a zero-trapping enable signal to look up a fast translation table to obtain micro-operations corresponding to the particular complex instruction for running execution units of the processor,
wherein the fast translation table is stored in a first storage device that is in a micro-operation bit width.

14. The method as claimed in claim 13, further comprising:
when determining that a received macro instruction is a normal complex instruction, providing a normal decoder enable signal to enable a normal decoder to obtain micro-operations corresponding to the normal complex instruction by reading a second storage device, for running the execution units of the processor, wherein:
the second storage device that is in a different bit width than the micro-operation bit width; and
the normal decoder takes multiple time cycles to decompress and decode contents read from the second storage device; and
contents read from the fast translation table do not require decompression.

15. The method as claimed in claim 14, wherein:
the first storage device has a plurality of banks, the number of which is equal to the maximum number of micro-operations that the normal decoder outputs per time cycle.

16. The method as claimed in claim 15, further comprising:
based on a lookup result which is the result of looking it up in the fast translation table, generating valid labels, and tagging the valid labels on the micro-operations corresponding to the particular complex instruction.

17. The method as claimed in claim 15, further comprising:
combining contents read from the fast translation table with processor information, to generate the micro-operations corresponding to the particular complex instruction.

18. The method as claimed in claim 15, further comprising:
based on a lookup result which is the result of looking it up in the fast translation table, generating an ending mark signal;
based on the ending mark signal and a sudden unexpected event, generating a zero-trapping output control signal; and
based on the zero-trapping output control signal, determining whether to adopt the micro-operations obtained by querying the fast translation table.

19. The method as claimed in claim 15, further comprising:
transferring a trap address or a self-incremented address to the first storage device to query the fast translation table;
wherein:
the trap address is provided by the register alias table hardware, which is used for a first time cycle query of the fast translation table; and the self-incremented address is used for querying the fast translation table in consecutive time cycles following the first time cycle query.

20. The method as claimed in claim 14, wherein:

the second storage device stores compressed microcode instructions;

through operations in a first time interval, the normal decoder receives a trap address from the register alias table hardware;

through operations in a second time interval, the normal decoder reads the second storage device according to the trap address to obtain compressed microcode instructions;

through operations in a third time interval, the normal decoder decompresses the compressed microcode instructions; and through operations in a fourth time interval, the normal decoder decodes the decompressed microcode instructions to obtain the micro-operations corresponding to the normal complex instruction.

21. The method as claimed in claim 14, further comprising:

when determining that a received macro instruction is a simple instruction, translating, without accessing the first storage device and without accessing the second storage device, the simple instruction into micro-operations corresponding to the simple instruction for running execution units of the processor.

22. The method as claimed in claim 14, wherein:

the particular complex instruction is a performance-sensitive instruction; and the number of micro-operations corresponding to the particular complex instruction is within a specific amount, or an occurrence frequency of the particular complex instruction is higher than a critical frequency.

23. The method as claimed in claim 14, wherein:

the particular complex instruction does not involve local branches that need to be processed at a decoding stage.

\* \* \* \* \*